United States Patent
Tavallaei et al.

(10) Patent No.: US 12,314,174 B2
(45) Date of Patent: *May 27, 2025

(54) ADDRESSING FOR DISAGGREGATED MEMORY POOL

(71) Applicant: Microsoft Technology Licensing, LLC, Redmond, WA (US)

(72) Inventors: Siamak Tavallaei, Spring, TX (US); Ishwar Agarwal, Redmond, WA (US); Vishal Soni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/024,590

(22) PCT Filed: May 31, 2021

(86) PCT No.: PCT/US2021/035064
§ 371 (c)(1),
(2) Date: Mar. 3, 2023

(87) PCT Pub. No.: WO2022/051002
PCT Pub. Date: Mar. 10, 2022

(65) Prior Publication Data
US 2023/0315626 A1    Oct. 5, 2023

Related U.S. Application Data

(63) Continuation-in-part of application No. 17/011,906, filed on Sep. 3, 2020, now Pat. No. 11,210,218.

(51) Int. Cl.
*G06F 12/06* (2006.01)
*G06F 9/50* (2006.01)

(52) U.S. Cl.
CPC ........ *G06F 12/0653* (2013.01); *G06F 9/5016* (2013.01); *G06F 12/0607* (2013.01)

(58) Field of Classification Search
CPC ............. G06F 12/0653; G06F 12/0607; G06F 2212/1008; G06F 3/061; G06F 3/0631;
(Continued)

(56) References Cited

U.S. PATENT DOCUMENTS 8,082,400 B1    12/2011    Chang et al.
10,346,360 B1    7/2019    Basov
(Continued)

OTHER PUBLICATIONS

"Ex Parte Quayle Action Issued in U.S. Appl. No. 17/011,906", Mailed Date: Jun. 10, 2021, 7 Pages.
"Notice of Allowance Issued in U.S. Appl. No. 17/011,906", Mailed Date: Sep. 1, 2021, 8 Pages.
"Application as Filed in U.S. Appl. No. 62/851,287", filed May 22, 2019, 40 Pages.
(Continued)

*Primary Examiner* — Michael Krofcheck
(74) *Attorney, Agent, or Firm* — Ray Quinney & Nebeker; James Bullough

(57) ABSTRACT

A method for memory address mapping in a disaggregated memory system includes receiving an indication of one or more ranges of host physical addresses (HPAs) from a compute node of a plurality of compute nodes, the one or more ranges of HPAs including a plurality of memory addresses corresponding to different allocation slices of the disaggregated memory pool that are allocated to the compute node. The one or more ranges of HPAs are converted into a contiguous range of device physical addresses (DPAs). For each DPA, a target address decoder (TAD) is identified based on a slice identifier and a slice-to-TAD index. Each DPA is mapped to a media-specific physical element of a physical memory unit of the disaggregated memory pool based on the TAD.

20 Claims, 6 Drawing Sheets

(58) Field of Classification Search
CPC ............. G06F 3/064; G06F 2212/1016; G06F 2212/1041; G06F 2212/154; G06F 2212/163; G06F 12/1072; G06F 3/067; G06F 9/5016; G06F 3/0659; G06F 9/5022

See application file for complete search history.

(56) References Cited

U.S. PATENT DOCUMENTS

| | | | |
|---|---|---|---|
| 2011/0271014 | A1 | 11/2011 | Turner et al. |
| 2015/0134824 | A1 | 5/2015 | Mickens et al. |
| 2017/0285973 | A1 | 10/2017 | Dalmatov |
| 2018/0077235 | A1 | 3/2018 | Nachimuthu et al. |
| 2018/0284996 | A1 | 10/2018 | Guim Bernat et al. |
| 2018/0341606 | A1 | 11/2018 | Bolkhovitin et al. |
| 2019/0391855 | A1 | 12/2019 | Bernat et al. |
| 2020/0019515 | A1 | 1/2020 | Koufaty et al. |
| 2020/0125503 | A1 | 4/2020 | Graniello et al. |
| 2020/0133876 | A1 | 4/2020 | Bielski et al. |

OTHER PUBLICATIONS

Coughlin, Tom, "Memory-Centric Architectures with Gen-Z and CXL Alliance", Retrieved From: https://www.forbes.com/sites/tomcoughlin/2020/04/05/memory-centric-architectures-with-gen-z-and-cxl-alliance/#434e8ece5523, Apr. 5, 2020, 4 Pages.

Hormuth, Robert, "Dell EMC's 2020 Server Trends & Observations", Retrieved From: https://www.dell.com/en-us/blog/dell-emc-2020-server-trends-observations/#tab0=0, Jan. 14, 2020, 3 Pages.

"International Search Report and Written Opinion Issued in PCT Application No. PCT/US21/035064", Mailed Date: Oct. 7, 2021, 14 Pages.

Ruggles, Gary, "Introduction to the Compute Express Link Standard", Retrieved From: https://web.archive.org/web/20191130015826/https:/www.synopsys.com/designware-ip/technical-bulletin/compute-express-link-standard-2019q3.html, Nov. 30, 2019, 11 Pages.

Communication under Rule 71(3) received in European Application No. 21735503.1, mailed on Aug. 22, 2024, 07 pages.

Decision to Grant pursuant to Article 97(1) received for European Application No. 21735503.1, mailed on Dec. 19, 2024, 02 Pages.

ADDRESSING FOR DISAGGREGATED MEMORY POOL

BACKGROUND

Data centers typically include large numbers of discrete compute nodes, such as server computers or other suitable computing devices. Such devices may work independently and/or cooperatively to fulfill various computational workloads.

DETAILED DESCRIPTION

As discussed above, data centers typically include large numbers of discrete compute nodes, such as server computers or other suitable computing devices. Such compute nodes may be referred to as "host computing devices," or "hosts," as they may in some cases be used to host a plurality of virtual machines. It will be understood, however, that a compute node may be used for any suitable computing purpose, and need not be used for hosting virtual machines specifically. Furthermore, in some examples, a compute node may be implemented as a virtual machine.

Depending on the specific implementation, each individual compute node may have any suitable collection of computer hardware. For instance, traditional servers may each be substantially self-sufficient, including processing resources, data storage, volatile/non-volatile memory, network interface componentry, a power supply, a cooling solution, etc. By contrast, some "blade servers" omit internal power supplies, cooling systems, and/or network interfaces, instead relying on a central rack to provide such infrastructure-type functionality for each of a cluster of individual blade servers plugged into the rack.

Regardless, each individual compute node will typically include some local collection of hardware resources, including data storage, memory, processing resources, etc. However, computational workloads (e.g., associated with data center customers) are often not uniformly distributed between each of the compute nodes in the data center. Rather, in a common scenario, a subset of compute nodes in the data center may be tasked with resource-intensive workloads, while other nodes sit idle or handle relatively less resource-intensive tasks. Thus, the total resource utilization of the data center may be relatively low, and yet completion of some workloads may be resource-constrained due to how such workloads are localized to individual nodes. This represents an inefficient use of the available computer resources, and is sometimes known as "resource stranding," as computer resources that could potentially be applied to computing workloads are instead stranded in idle or underutilized hosts.

This problem can be mitigated when hardware resources are pulled out of individual compute nodes and are instead disaggregated as separate resource pools that can be flexibly accessed by connected compute nodes. For example, the present disclosure primarily contemplates scenarios in which volatile memory hardware (e.g., random-access memory (RAM)) is collected as part of a disaggregated memory pool, from which it may be utilized by any of a plurality of compute nodes—e.g., in a data center. This serves to alleviate resource stranding, as compute nodes are free to request memory when needed, and release such memory when no longer needed.

Figure 1:
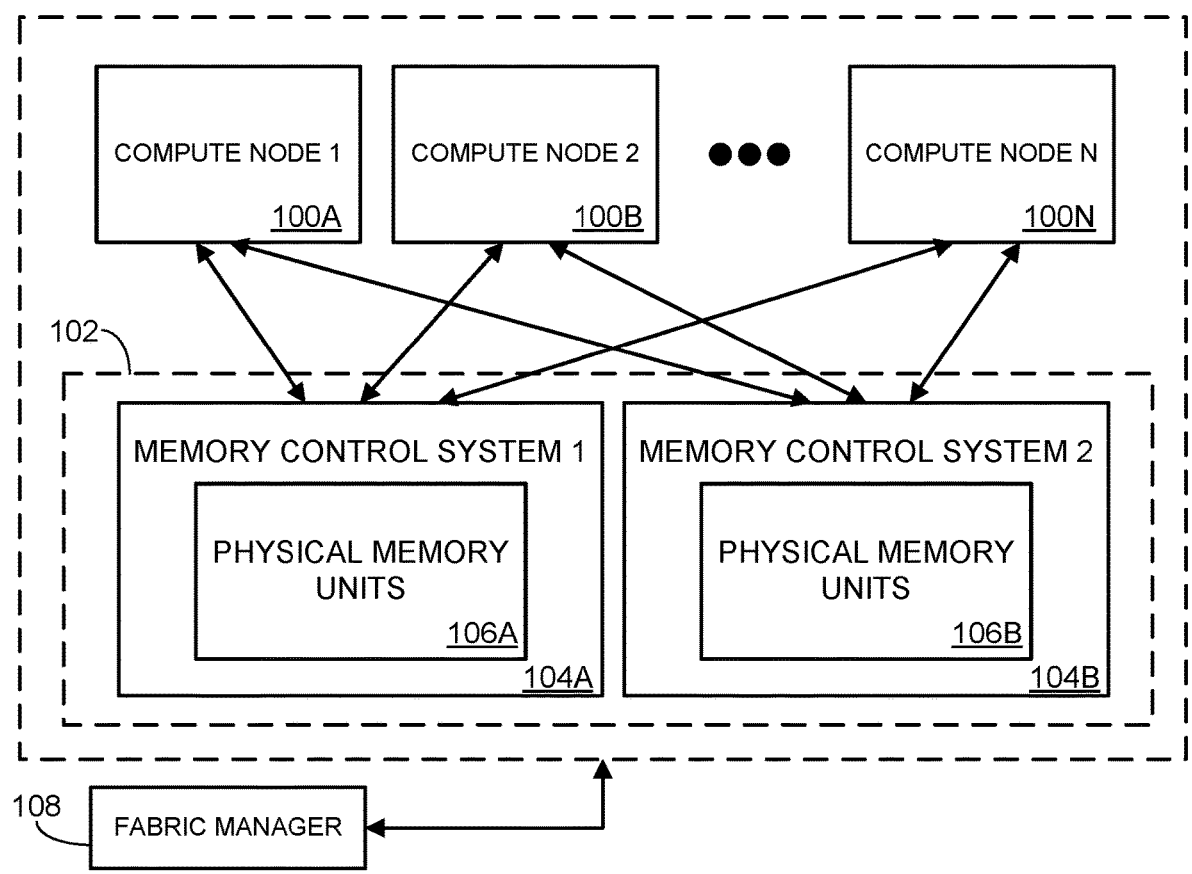
FIG. 1 schematically depicts a plurality of compute nodes communicatively coupled with a disaggregated memory pool.

This is schematically illustrated with respect to FIG. 1. As shown, a plurality of compute nodes 100A-100N (where N is any suitable positive integer) are communicatively coupled with a disaggregated memory pool 102. In various examples, dozens, hundreds, thousands, or more individual compute nodes may share access to one or more disaggregated resource pools, including disaggregated memory pool 102.

The disaggregated memory pool is comprised of at least two memory control systems 104A and 104B, which respectively govern and maintain sets of physical memory units 106A and 106B. In this example, the memory control systems cooperate to provide a single disaggregated memory pool. In other examples, however, a disaggregated memory pool may only include one memory control system. The memory control systems may, as one example, be compute express link (CXL)-compliant pooled memory controllers (CPMCs). The physical memory units may, for example, be any suitable type of volatile RAM—e.g., Double Data Rate Synchronous Dynamic RAM (DDR SDRAM). The memory control systems may facilitate use of the physical memory units by any or all of the various compute nodes 100A-100N. It will be understood that a disaggregated memory pool may include any suitable number of physical memory units, corresponding to any suitable total memory capacity, and may be governed by any number of different memory control systems.

In some examples, the amount of memory collectively allocated to the plurality of compute nodes may exceed the amount of memory actually provisioned in the disaggregated memory pool. This is sometimes referred to as "thin provisioning." In general, in data center environments without thin provisioning, it can be observed that individual compute nodes (and/or virtual machines implemented on the compute nodes) are often provisioned with more resources (e.g., storage space, memory) than the compute nodes end up actually using, statistically over time. For instance, the amount of memory installed for a particular compute node may be significantly higher than the amount of memory actually utilized by the compute node in most situations. When compounded over a plurality of compute nodes, the amount of unused memory (or other resources) can represent a significant fraction of the total memory in the data center.

In one example scenario without thin provisioning, a disaggregated memory pool may include 1 TB (1024 GB) of total memory, which may be distributed evenly between eight compute nodes. Furthermore, each compute node may include 128 GB of natively-attached memory. Thus, each compute node may be assigned 128 GB of memory of the disaggregated memory pool, while having a total of 256 GB of provisioned memory between the natively-attached memory and pooled memory. In aggregate, the eight compute nodes may have access to 2 TB of memory total, again between the natively-attached memory and pooled memory. In this example, as a result to the 128 GB of native memory and 128 GB of pooled memory, each node is allocated 256 GB of memory from the perspective of the node's internal OS and memory system. That is, the node "sees" 256 GB of available memory.

However, it is generally unlikely that each compute node will fully utilize its memory allocation. Rather, in a more common scenario, each compute node may only use a maximum of 50% of its allocated memory during normal usage, and some compute nodes may use significantly less than 50%. As such, even though the 1 TB disaggregated memory pool will be fully assigned to the plurality of compute nodes, only a relatively small fraction of the pooled memory may be in use at any given time, and this represents an inefficient use of the available resources.

Given this, the amount of memory actually available—i.e., "provisioned" in the memory pool—could be reduced without significantly affecting performance of the plurality of compute nodes. For instance, the memory space of each compute node could still be constructed so that the pool portion of its memory allocation was 128 GB (thus amounting to 1 TB when summing the eight nodes), for example by providing an address range for 128 GB remote memory, however, the memory pool could be actually provisioned with only a total of 256 GB. Thus, the amount of allocated memory exceeds the amount of memory that is actually provisioned. In other words, while each particular compute node may be allocated 128 GB of pool memory, it is statistically likely that many compute nodes will not use all, or even a significant portion, of that 128 GB at any given time. Thus, any unused memory assigned to one compute node may be reassigned to one or more of the other nodes. In this manner, any particular compute node has the option to use up to 128 GB of pool memory if needed, while still conserving memory in the disaggregated pool, due to the fact that each compute node typically will not use 128 GB at any given time.

Such thin provisioning may be done to any suitable extent. It is generally beneficial for the amount of available memory to exceed the amount of memory typically used by the plurality of compute nodes under typical circumstances. In other words, if the compute nodes typically use around 256 GB, then it is generally desirable to have more than 256 GB of memory actually provisioned between the natively-attached memory and pooled memory, such that the compute nodes do not exhaust the available memory during normal use. In practice, however, any suitable amount of memory may be provisioned in the disaggregated memory pool, which may have any suitable relationship with the amount of memory allocated to the plurality of compute nodes.

When thin provisioning is implemented, there may be instances in which the plurality of compute nodes attempts to collectively use more memory than is available in the disaggregated memory pool. This may be referred to as "pressuring" the memory pool. Various actions may be taken to address this scenario. For example, memory assignment may be stripped away from one or more compute nodes regarded as having a lower priority or lower need for the memory. Additionally, or alternatively, memory requests for the plurality of compute nodes may be routed to a different disaggregated memory pool that may still have available memory, at the cost of higher latency.

Notably, the memory addressing techniques described herein may be implemented with or without thin provisioning. In other words, memory address mapping as discussed herein may occur in "thin" provisioned or "thick" provisioned contexts. Furthermore, both thick and thin provisioning techniques may be used in the same implementation.

Additionally, or alternatively, each compute node may be pre-assigned some amount of memory capacity in the disaggregated memory pool. If and when a particular compute node completely fills its assignment and requests a larger assignment, the node may negotiate with the memory control system (e.g., CPMC) to determine whether and how much additional memory the node should be assigned, and this may include reducing the assignment reserved for another node. In this manner, the amount of memory capacity available in the disaggregated pool may be carefully balanced and divided between the plurality of compute nodes in keeping with each node's actual needs, rather than allow each individual compute node to seize pool capacity they have no need for.

FIG. 1 also schematically depicts a fabric manager 108. The fabric manager may be configured to monitor and govern the entire computing environment, including the plurality of compute nodes and disaggregated memory pool. The fabric manager may, for example, set and apply policies that facilitate efficient and secure use of the disaggregated memory pool by each of the plurality of compute nodes.

However, such a disaggregated approach can increase overall system complexity, particularly with regard to coordinating memory addressing between individual hosts, memory control systems of the disaggregated memory pool, and the individual physical memory units within the pool. Existing solutions often require large continuous range-based chunks of memory to be mapped to each compute node. For example, memory may be allocated to each compute node as a continuous range of memory addresses collectively amounting to 16 GB. This limits the amount and granularity of resource disaggregation that may be achieved, as any host that requests memory may be granted at least 16 GB, regardless of how much is actually needed. This again contributes to resource stranding, in the common case where significantly less than 16 GB was actually required. Furthermore, when large memory chunks are allocated to individual hosts, it can make it more difficult to off-line such memory when it could be better served somewhere else, as the off-line request may be refused when even a small portion of the memory chunk is still in use by the host.

Accordingly, the present disclosure describes techniques for memory address mapping for a disaggregated memory pool. Specifically, a memory control system may receive one or more ranges of host physical addresses (HPAs) from one or more compute nodes of a plurality of compute nodes communicatively coupled with the disaggregated memory pool. The HPAs may reflect the compute node's internal understanding of the memory available to it, and the ranges of HPAs may be received, for example, as the compute node is attempting to read/write/access data associated with the HPAs. Once received at the memory control system, the set of HPAs may be converted into a range of device physical addresses (DPAs), which may in some cases be continuous and zero-based. DPAs for multiple different compute nodes may be mapped to a set of pooled physical addresses (PPAs) controlled by the memory control system, and corresponding to all of the memory addresses accessible to all of the plurality of compute nodes making use of the memory control system. For each DPA, the memory control system may identify a target address decoder (TAD) useable to map the memory address to a media-specific physical element of a physical memory unit. In this manner, HPAs for any of a plurality of compute nodes, interleaved between any of a plurality of memory control systems, may be mapped to individual physical elements of a plurality of physical memory units. Because such mapping is done on the basis of relatively small (e.g., 1 GB) allocation slices, the problems outlined above with respect to resource stranding and off-lining may be at least partially mitigated.

Furthermore, significant latency benefits may be achieved by virtue of the herein-described techniques. For example, when memory addresses from a particular compute node are interleaved between a plurality of different memory control systems, such memory accesses may be done in parallel rather than in series, resulting in faster overall performance. Furthermore, as will be described in more detail below, identification of a TAD for any given DPA may use an index-based lookup method, with a latency of as low as 2 ns. Thus, disaggregation of memory may be achieved without significantly increasing system latency over natively-attached memory.

Figure 2:
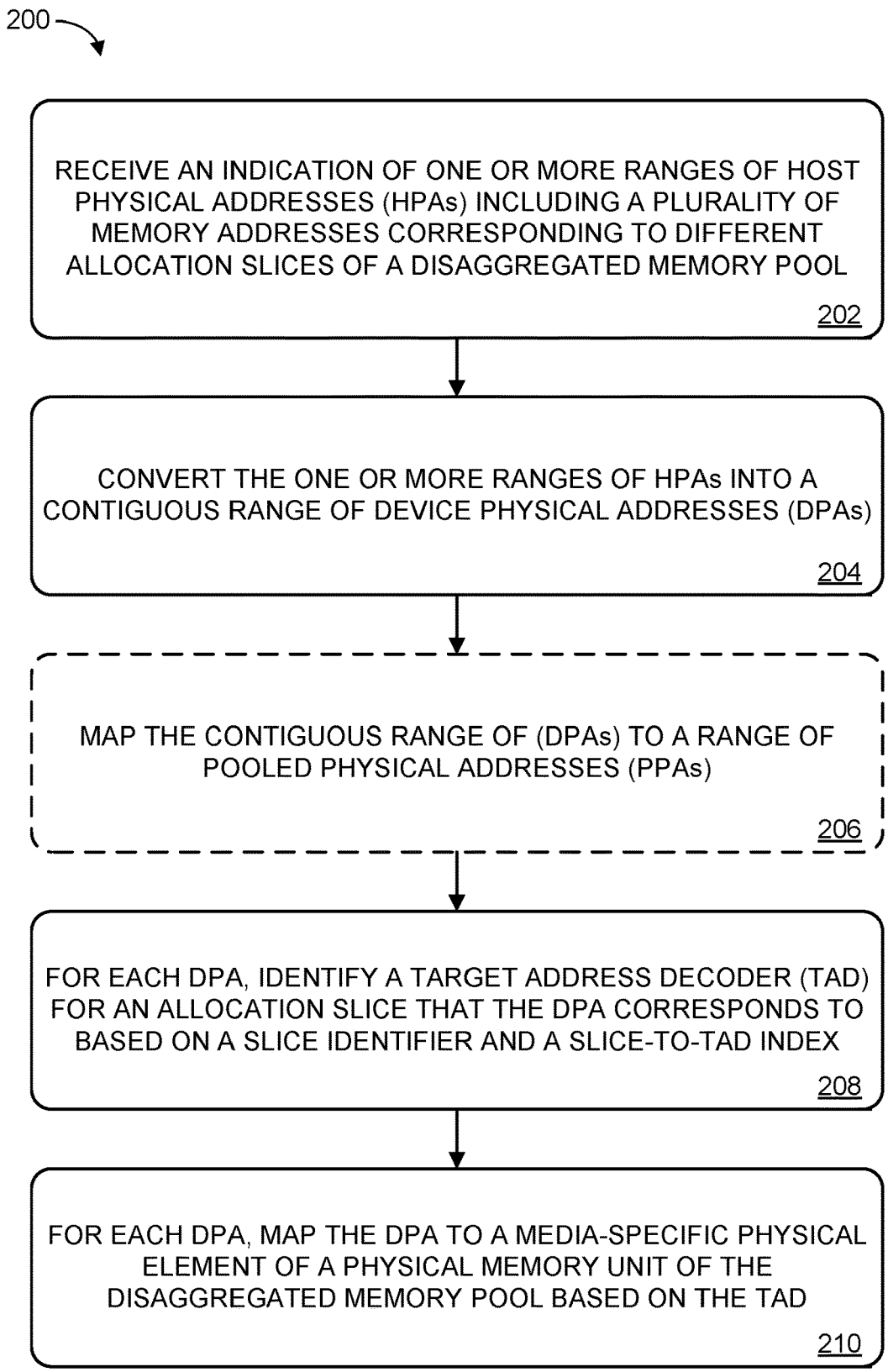
FIG. 2 illustrates an example method for memory address mapping.

FIG. 2 illustrates an example method 200 for memory address mapping in a disaggregated memory pool. Method 200 may be implemented using any suitable collection of computer hardware, having any suitable capabilities and form factor. In one example, method 200 may be implemented via a memory control system (e.g., a CPMC), such as memory control systems 104A and 104B. Any or all of the computing systems described herein, including the compute nodes, memory control systems, and fabric manager, may be implemented as computing system 900 described below with respect to FIG. 9.

At 202, method 200 includes receiving an indication of one or more ranges of HPAs from a compute node of a plurality of compute nodes communicatively coupled to a disaggregated memory pool. The one or more ranges of HPAs include a plurality of memory addresses corresponding to different allocation slices of the disaggregated memory pool that are allocated to the compute node. An indication of one or more ranges of HPAs may be received at any time and for any reason. For example, an indication of one or more ranges of HPAs may be received when a compute node attempts to read/write/access memory associated with the HPAs and included in the disaggregated memory pool.

Figure 3:
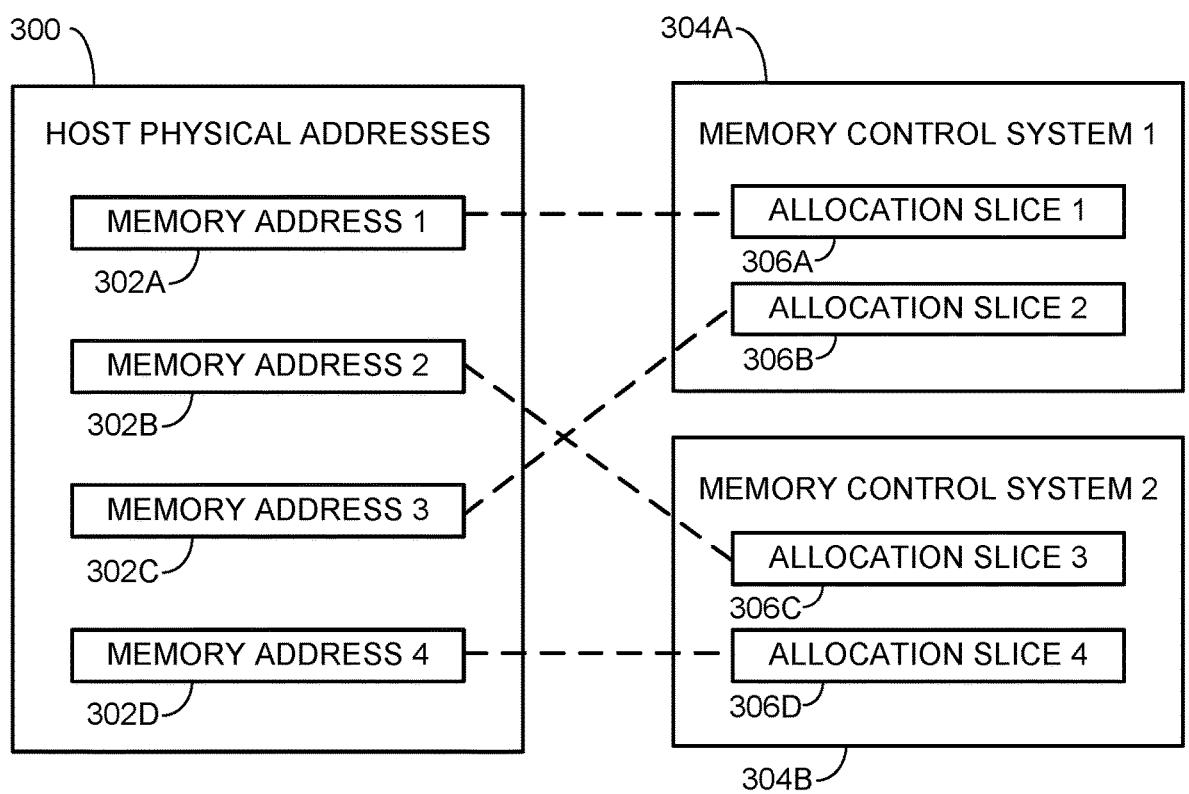
FIG. 3 schematically depicts interleaving of memory addresses between different allocation slices of different memory control systems.

This is schematically shown in FIG. 3, which includes a set of HPAs received from a single compute node. For example, HPAs 300 may be received at memory control system 104A from compute node 100A of FIG. 1, and include memory addresses 302A-302D allocated to the compute node. In general, a "host physical address" is a particular compute node's internal identifier for a particular memory address within the node's larger address space. Reads and writes to a particular HPA may ultimately terminate at a physical memory unit (e.g., RAM DIMM) in the disaggregated memory pool. In general, each compute node may be generally unaware of the specifics involved with disaggregation of volatile memory. Instead, the collective memory of the entire disaggregated memory pool may be presented to each compute node as being potentially available, and thereby addressable via HPAs. However, at any given time, any memory not explicitly allocated to a particular compute node may be marked "offline" from the perspective of the compute node. Thus, the compute node may generate memory read/write requests for HPAs corresponding to disaggregated memory just as would be done for natively-attached memory—i.e., physical memory units that are integrated within, and reserved for, the compute node. When the compute node attempts to access (e.g., read or write) a particular HPA or range of HPAs, method 200 may be initiated when the memory control system receives an indication of the relevant HPA(s) from the compute node.

Memory may be allocated to compute nodes of the plurality in units of "allocation slices," such that each allocation slice is allocated to one host. It will be understood that, at any given time, not all allocation slices need be allocated to compute nodes. Similarly, at any given time, there may be some compute nodes that have no allocation slices currently allocated to them. As one example, each allocation slice may be 1 GB in size, although other suitable sizes may be used—e.g., 512 MB, 2 GB, 4 GB. The disaggregated memory pool may additionally have any suitable total capacity. For example, the disaggregated memory pool may have 1 TB of total memory, divided between 1024 1 GB allocation slices, although any other suitable values may be used.

Different allocation slices may be allocated to the same compute node at different times—e.g., on a first-come first-served basis, or based on changing workloads. Accordingly, in the case where two or more allocation slices are allocated to the same compute node, those allocation slices will be represented by two different ranges of HPAs, among the plurality of HPAs corresponding to the entire disaggregated memory pool. Thus, the set of HPAs received by a memory control system from a particular compute node may be non-contiguous—e.g., there may be a gap in available HPAs between where one allocation slice ends and another begins.

Additionally, or alternatively, different HPAs for a particular compute node may be interleaved between different memory control systems. In some cases, this may improve overall performance, because it allows the compute node to interface with multiple memory control systems in parallel when attempting to retrieve any particular data. Thus, the latency for a system that uses such interleaving may be generally lower than a corresponding system in which all memory addresses for a particular node are handled by the same memory control system, as memory accesses may be handled in parallel rather than in series. Any suitable interleave granularity and number of interleave ways may be used. In the example of FIG. 3, the individual memory addresses are interleaved two ways, in which the HPAs for a particular compute node are interleaved between two different memory control systems. Each memory address may be, for example 64 bits, although other suitable address sizes may be used. Thus, once again, the set of HPAs received by a memory control system from a particular compute node may be non-contiguous—e.g., some HPAs for the compute node may correspond to other memory control systems due to interleaving.

Furthermore, HPAs corresponding to a particular memory control system may be interleaved between multiple different allocation slices of the memory control system. This is also schematically shown in FIG. 3, in which the four different HPAs 302A-302D are divided between four different allocation slices 306A-306D of the two memory control systems 304A and 304B. It will be understood that the specific arrangements depicted in FIG. 3 are not limiting, and that FIG. 3 (as well as the other FIGS. described herein) are presented only as visual aids. In practice, any number of HPAs of a particular compute node may be interleaved between any suitable number of memory control systems and allocation slices. Typical embodiments will be dramatically scaled up from the simplified examples herein, and will involve thousands or more compute nodes being serviced by large numbers of memory control systems.

Returning briefly to FIG. 2, at 204, method 200 includes converting the one or more ranges of HPAs into a contiguous range of device physical addresses (DPAs). As discussed above, the one or more ranges of HPAs will typically be noncontiguous, due to one or both of inter-slice gaps, and interleaving between different memory control systems. However, any particular memory control system receiving memory accesses from a compute node will typically be required to reserve a single, contiguous range of memory addresses for use by that node. Thus, if the memory control system simply reserved a range of addresses between the lowest and highest HPAs that any given node accesses, this will likely result in some amount of stranded memory. For instance, one particular compute node may have 4 GB of memory allocated to it, interleaved between four different memory control systems. Any particular memory control system may therefore receive memory accesses from that compute node spread over a 4 GB range, and thus may reserve the full 4 GB range for that node. However, due to interleaving, the node may only actually use 1 GB of that 4 GB range.

Accordingly, to avoid memory stranding, the memory control system may first convert the one or more noncontiguous ranges of HPAs into a single, contiguous range of DPAs. In other words, after a memory control system receives one or more ranges of HPAs from a particular compute node, the memory control system may ignore or discard any HPAs maintained by other memory control systems, or otherwise corresponding to addresses that will not be used by the compute node from that memory control system's perspective. To reuse the above example, memory accesses spread over a noncontiguous 4 GB range may be converted into a single contiguous range of addresses corresponding to 1 GB, as those are the only addresses belonging to the memory control system actually used by the compute node. This may be described as "compressing out" any HPAs not maintained by the memory control system. As such, each HPA maintained by the memory control system is remapped to result in a contiguous range of only the memory addresses maintained by the memory control system, in contrast to the one or more ranges of HPAs, which may include addresses interleaved between a plurality of memory control systems as described above.

Figure 4:
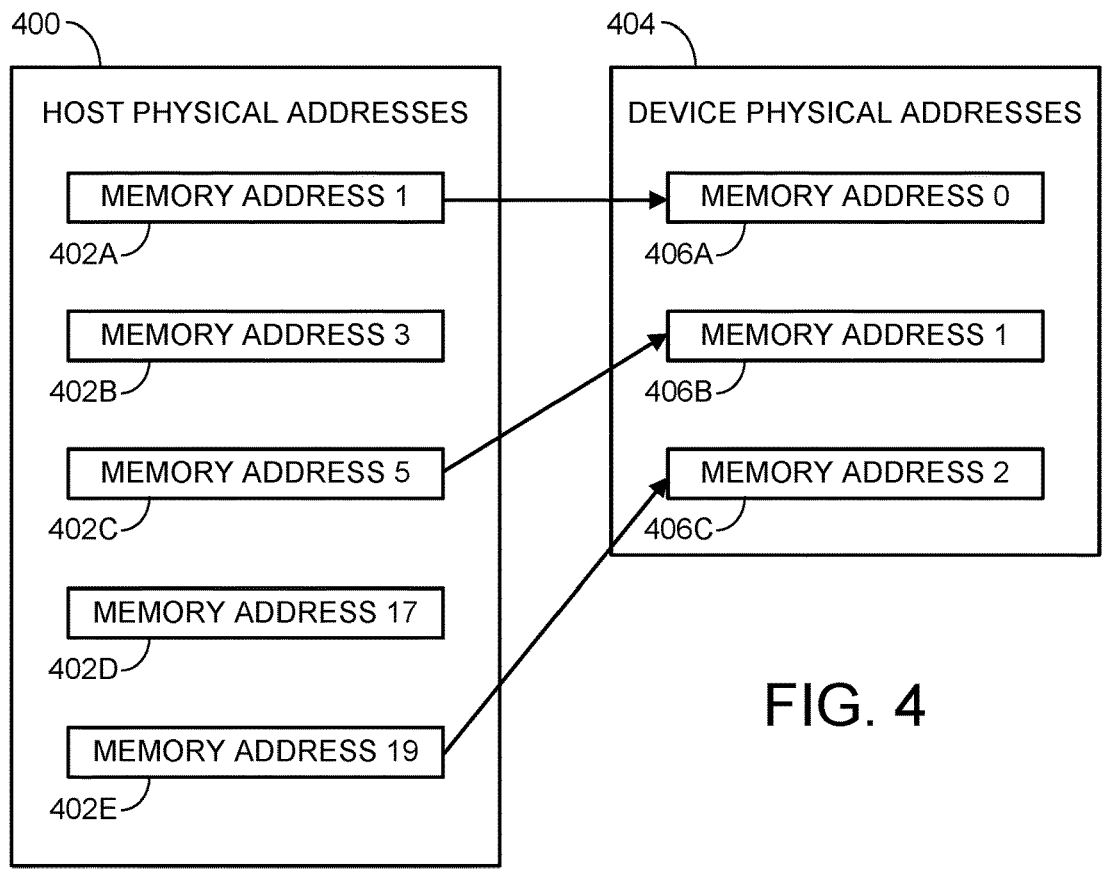
FIG. 4 schematically illustrates conversion of host physical addresses to device physical addresses.

This is schematically illustrated in FIG. 4, which shows another example set of HPAs 400, including memory addresses 402A-402E. As shown, HPAs 400 are non-contiguous—e.g., due to interleaving or gaps between allocation slices as discussed above. HPAs 400 are converted into a set of DPAs 404, including memory addresses 406A-406C. Notably, some HPAs in set 400 are maintained by other memory control systems, and thus are compressed out during conversion into DPAs. Furthermore, in this example, the range of DPAs is zero-based. In other words, the first memory address in the contiguous range may be labeled as address 0, while the second address is labeled as address 1, and so on.

Returning again to FIG. 2, at 206, method 200 optionally includes mapping the contiguous range of DPAs to a set of pooled physical addresses (PPAs). Specifically, as discussed above, the memory controller may receive HPAs from each of a plurality of compute nodes, and covert such HPAs into several sets of node-specific DPAs. Thus, to more effectively map individual memory accesses to physical memory media, the memory control system may first map the several node-specific DPA ranges to a single pool-specific range of PPAs.

Figure 5:
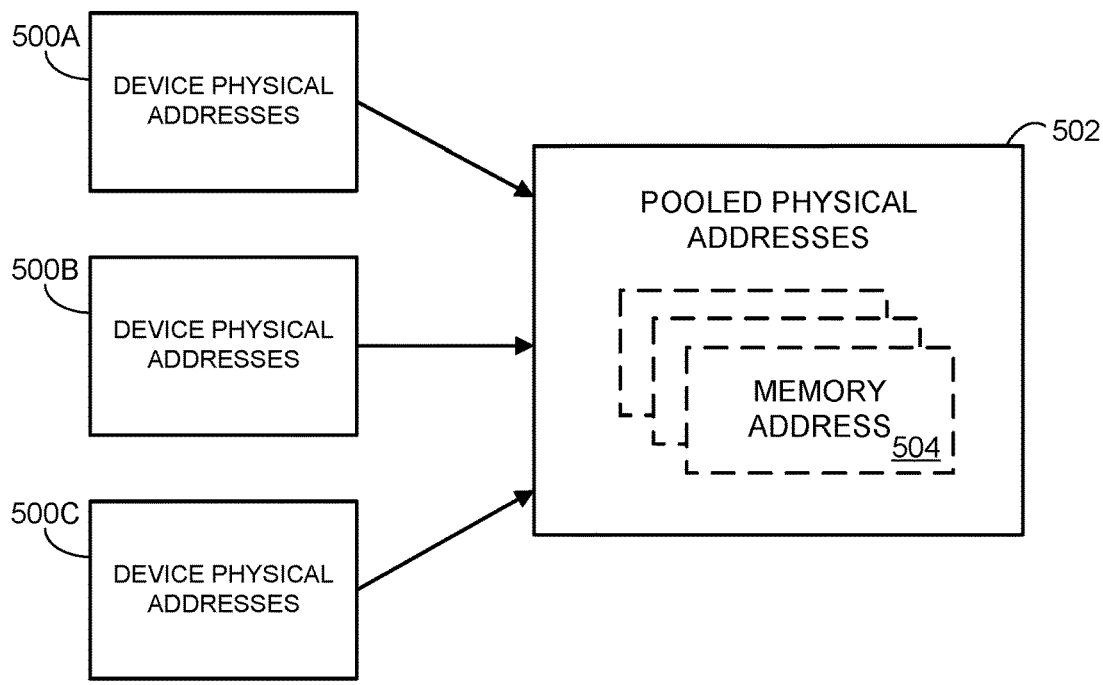
FIG. 5 schematically illustrates mapping of device physical addresses to a set of pooled physical addresses.

This is schematically illustrated in FIG. 5, in which several sets of DPAs 500A-500C are mapped to a set of PPAs 502, including memory addresses 504. As discussed above, HPAs for a particular compute node may be interleaved between any number of different memory control systems. Once converted into a contiguous range of DPAs, the memory addresses may be specific to a particular memory control system and compute node—e.g., DPAs 500A-500C may correspond to different compute nodes while being maintained by the same memory control system. By contrast, the set of PPAs may still be specific to a particular memory control system, but node-agnostic. In other words, a set of PPAs may represent substantially all the memory addresses that a particular memory control system is responsible for. From there, the memory control system may map memory addresses to media-specific elements of physical memory units, as will be described in more detail below.

Returning again to FIG. 2, at 208, method 200 includes, for each DPA, identifying a target address decoder (TAD) for an allocation slice of the disaggregated memory pool that the DPA corresponds to. As will be described in more detail below, a TAD generally refers to a function used to map memory addresses of a particular allocation slice to media-specific physical elements of one or more physical memory units—e.g., discrete RAM DIMMs. In some cases, a TAD for a specific allocation slice may be selected from a set including multiple potential TADs, each having different performance characteristics. Different TADs may be used to implement different policy considerations—e.g., to prioritize performance vs fault tolerance.

Figure 6:
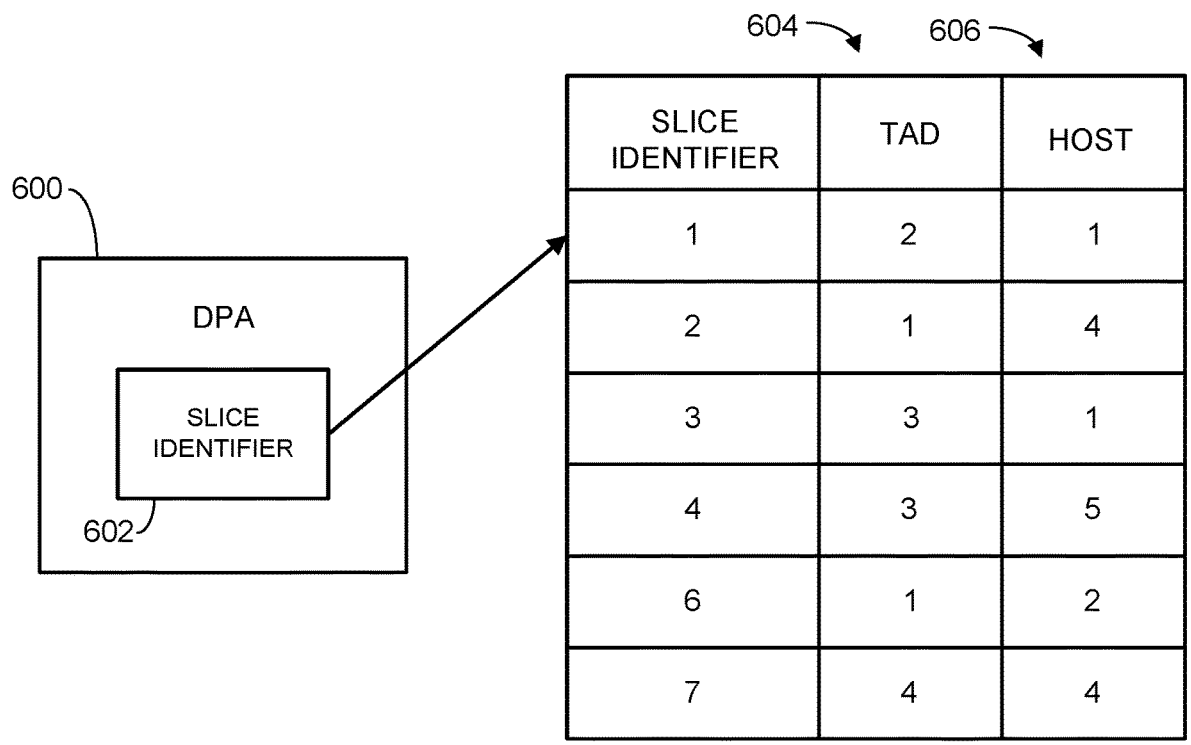
FIG. 6 schematically illustrates use of a slice identifier to identify a target address decoder for a device physical address.

Identification of a TAD for a DPA may be done based on a slice identifier included in the DPA and a slice-to-TAD index. This is schematically illustrated in FIG. 6, which shows an example DPA 600 including a slice identifier 602. The slice identifier is compared to a slice-to-TAD index 604, which lists a TAD identifier corresponding to the DPA, based on the slice identifier.

The slice identifier may take any suitable form. In one example, the slice identifier may be encoded using some number of bits of the DPA. As discussed above, the disaggregated memory pool may in some cases be divided into 1024 different allocation slices. Thus, the slice identifier may be encoded using the 10 upper bits of the DPA, and thereby uniquely identify the allocation slice of the disaggregated memory pool that the DPA corresponds to. In other examples, however, different numbers of allocation slices may be used, and thus different numbers of bits may be used to encode the slice identifier.

The slice-to-TAD index may take the form of any suitable data structure that include entries for each slice identifier, as well as an indication of a TAD to be used for each slice. In some cases, the slice identifier may additionally be referenced against a slice-to-node index, such as index 606 in FIG. 6. The slice-to-node index may include, for each slice identifier, an indication of which of the plurality of compute nodes that allocation slice has been allocated to. In other words, as the memory control system allocates different allocation slices of its available memory to different compute nodes of the plurality, it may maintain and update the slice-to-node index with entries indicating which slices have been allocated to which nodes. If and when a particular compute node attempts to access a particular memory address, the memory control system may first compare the slice identifier to the slice-to-node index to confirm that the compute node is not attempting to access memory that has not been allocated to it. Thus, the memory control system may, for each DPA, confirm that the allocation slice that the DPA corresponds to has been allocated to the compute node based on the slice identifier and the slice-to-node index.

The slice-to-TAD and slice-to-node indices may in some cases be separate data structures. Alternatively, these indices may be combined into a single index or table that includes two or more entries (e.g., a TAD identifier and a host identifier) for each allocation slice. Use of indices to identify the TAD and/or host allocation for a particular slice as described herein may result in significant latency improvements as compared to alternative approaches. For example, accessing the indices described herein may have a total latency of 2 ns.

A discussed above, a TAD may be described as a function used to map memory addresses of a particular allocation slice to media-specific physical elements of one or more physical memory units—e.g., discrete RAM DIMMs. In some cases, the memory control system may, for each allocation slice, select a TAD from a set including multiple potential TADs, where each TAD has different performance characteristics. For example, a performance-oriented TAD may interleave memory addresses of a single allocation slice between several different physical memory units, allowing the compute node to benefit from improved bandwidth and latency associated with accessing the different memory units in parallel. In this scenario, each individual memory unit will likely include memory addresses corresponding to a large number of different compute nodes. As a potential drawback, failure of any individual memory unit could therefore impact a large number of compute nodes.

Thus, by contrast, a TAD oriented toward fault-tolerance may map memory addresses of a particular allocation slice to relatively few (e.g., 1) physical memory unit(s). This may mitigate the impact of failure of any particular memory unit, as such a failure will likely impact relatively few compute nodes. In general, a memory control system may maintain any number of different TADs with different performance characteristics—e.g., balancing performance vs fault tolerance, and/or other relevant considerations.

In some cases, the slice-to-TAD index, slice-to-node index, and/or TAD policies may be maintained and controlled exclusively by the fabric manager (e.g., fabric manager 108 of FIG. 1). This may be done to prevent individual nodes or memory control systems from making changes that could negatively affect the entire computing environment. In other examples, however, other devices in addition to, or instead of, the fabric manager may be configured to modify or control the slice-to-TAD index, slice-to-node index, and/or TAD policies.

Typically, different TADs will be assigned on a per-slice basis. In other words, each memory address within a particular allocation slice will use the same TAD, but different allocation slices assigned to the same compute node can use different TADs. In other words, each of multiple allocation slices allocated to a particular compute node may use different TADs having different performance characteristics. In alternative implementations, however, all allocation slices assigned to the same compute node may use the same TAD. As another alternative, TADs may be assigned on a per-application or per-VM basis—e.g., allocation slices assigned to the same compute node may use different TADs depending on what VM or application they are used for. The specific criteria used to select a particular TAD for each allocation slice may vary depending on the implementation. In some examples, a client may specify their desired TAD on a per-slice, per-node, or per-VM basis—e.g., the client may indicate that their typical workloads are highly fault-sensitive, and therefore request a TAD that prioritizes fault-tolerance over total performance. Additionally, or alternatively, TADs may be selected by an owner/operator of the memory control system, and/or automatically selected by the fabric manager, to balance resource utilization within a larger data center environment.

Figure 7:
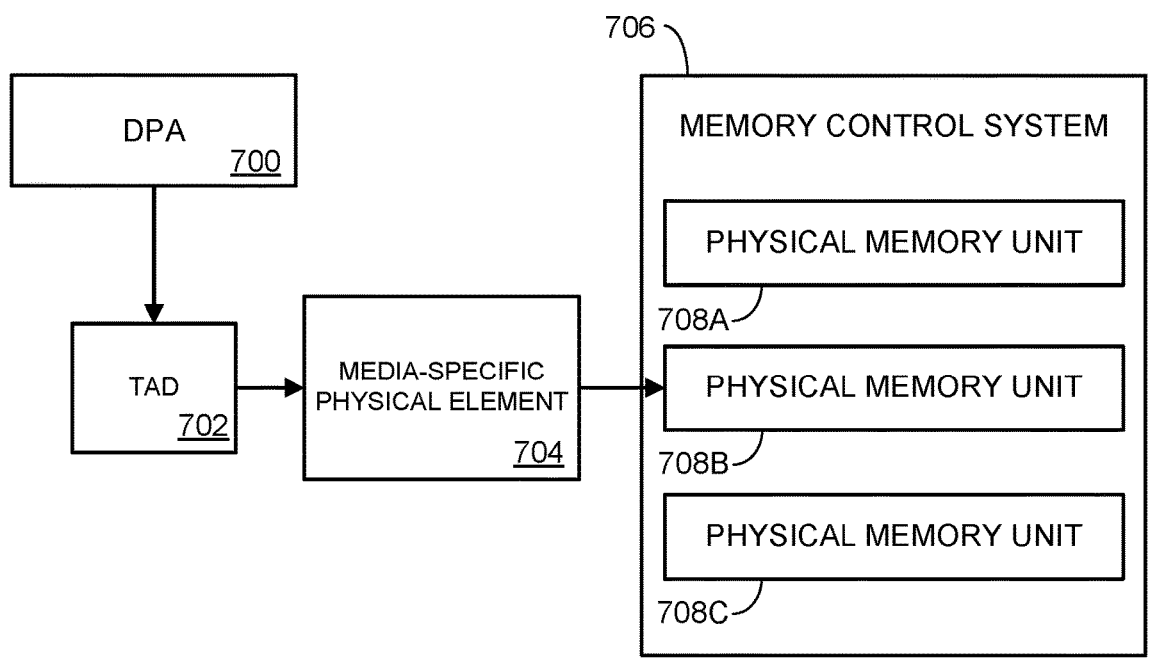
FIG. 7 schematically illustrates mapping of a device physical address to a physical memory unit of a disaggregated memory pool.

Returning again to FIG. 2, at 210, method 200 includes, for each DPA, mapping the DPA to a media-specific physical element of a physical memory unit of the disaggregated memory pool based on the TAD. This is schematically illustrated with respect to FIG. 7. As shown, for a particular DPA 700, a memory control system 706 that maintains several physical memory units 708A-708C uses a TAD 702 to map the DPA to a media-specific physical element 704. As discussed above, each physical memory unit may take the form of any suitable volatile memory technology, e.g., DDR SDRAM. Thus, mapping a PPA to a media-specific physical element may include mapping the DPA to a DIMM, bank, bank group, row, and column of a particular RAM unit. Again, in some cases, mapping of memory addresses to physical memory units via TADs may be governed by the fabric manager, to prevent any individual compute node or memory control system from compromising the environment as a whole.

Figure 8:
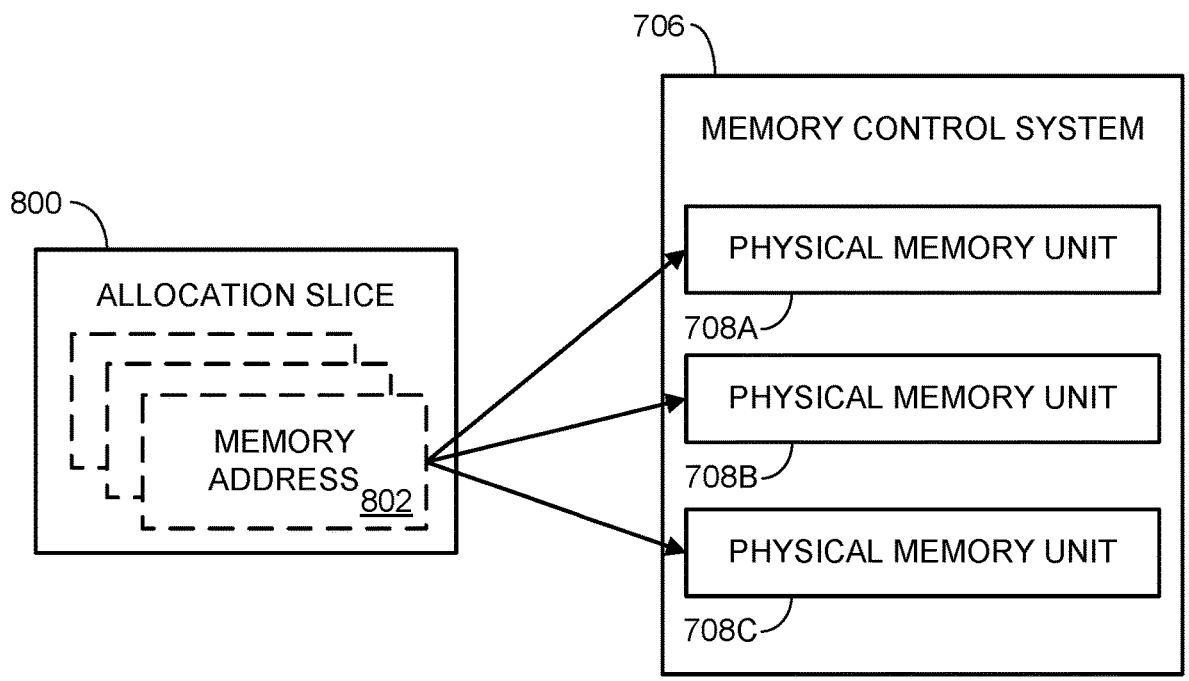
FIG. 8 schematically illustrates interleaving of memory addresses of an allocation slice between a plurality of physical memory units.

As discussed above, memory addresses are allocated to compute nodes in units of allocation slices. However, depending on which TAD is used, each memory address of a particular allocation slice need not be mapped to the same physical memory unit. Rather, in some examples, memory addresses corresponding to a particular allocation slice may be interleaved between a plurality of physical memory units of the disaggregated memory pool. This is schematically illustrated with respect to FIG. 8, which shows an example allocation slice 800 including a plurality of memory addresses 802. However, these memory addresses are interleaved between physical memory units 708A-708C by memory control system 706. As discussed above, the extent to which different memory addresses of a particular allocation slice are interleaved may depend on TAD, which can have different performance characteristics.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
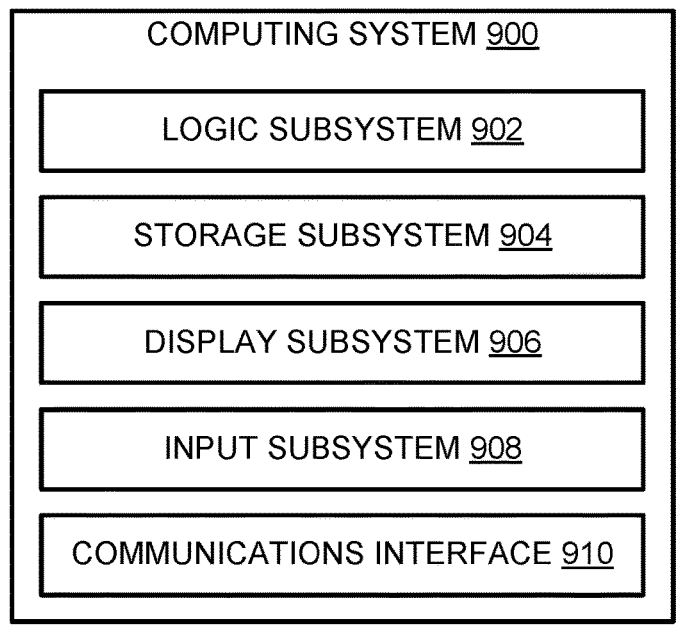
FIG. 9 schematically shows an example computing system.

FIG. 9 schematically shows a simplified representation of a computing system 900 configured to provide any to all of the compute functionality described herein. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910 and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for memory address mapping in a disaggregated memory pool comprises: receiving, at a memory control system, an indication of one or more ranges of host physical addresses (HPAs) from a compute node of a plurality of compute nodes communicatively coupled to the disaggregated memory pool, the one or more ranges of HPAs including a plurality of memory addresses corresponding to different allocation slices of the disaggregated memory pool that are allocated to the compute node; converting the two or more ranges of HPAs into a contiguous range of device physical addresses (DPAs); for each DPA, identifying a target address decoder (TAD) for an allocation slice of the disaggregated memory pool that the DPA corresponds to, based on a slice identifier included in the DPA and a slice-to-TAD index; and for each DPA, mapping the DPA to a media-specific physical element of a physical memory unit of the disaggregated memory pool based on the TAD. In this example or any other example, the one or more ranges of HPAs are non-contiguous. In this example or any other example, the continuous range of DPAs includes only memory addresses maintained by the memory control system, and where the one or more ranges of HPAs include memory addresses interleaved between a plurality of different memory control systems, such that parallel access of the plurality of different memory control systems by the compute node reduces a latency of memory access by the compute node. In this example or any other example, the continuous range of DPAs is zero-based. In this example or any other example, the slice identifier of each DPA is encoded by a plurality of bits of the DPA, and uniquely identifies the allocation slice of the disaggregated memory pool that the DPA corresponds to. In this example or any other example, the method further comprises, for each DPA, confirming that the allocation slice that the DPA corresponds to has been allocated to the compute node based on the slice identifier and a slice-to-node index. In this example or any other example, the TAD is selected from a set including multiple potential TADs, each having different performance characteristics. In this example or any other example, each of multiple allocation slices allocated to the compute node use different TADs having different performance characteristics. In this example or any other example, memory addresses corresponding to a particular allocation slice are interleaved between a plurality of physical memory units of the disaggregated memory pool. In this example or any other example, the method further comprises mapping the contiguous range of DPAs to a set of pooled physical addresses (PPAs) controlled by the memory control system, such that memory addresses from two or more compute nodes of the plurality are mapped to the set of PPAs. In this example or any other example, the physical memory units are dynamic random access memory (DRAM) units. In this example or any other example, each allocation slice corresponds to 1 gigabyte of memory.

In an example, a memory control system comprises: a logic subsystem configured to: receive an indication of one or more ranges of host physical addresses (HPAs) from a compute node of a plurality of compute nodes communicatively coupled with a disaggregated memory pool, the one or more ranges of HPAs including a plurality of memory addresses corresponding to different allocation slices of the disaggregated memory pool that are allocated to the compute node; convert the two or more ranges of HPAs into a contiguous range of device physical addresses (DPAs); for each DPA, identify a target address decoder (TAD) for an allocation slice of the disaggregated memory pool that the DPA corresponds to, based on a slice identifier included in the DPA and a slice-to-TAD index; and for each DPA, map the DPA to a media-specific physical element of a physical memory unit of the disaggregated memory pool based on the TAD. In this example or any other example, the one or more ranges of HPAs are non-contiguous. In this example or any other example, the continuous range of DPAs includes only memory addresses maintained by the memory control system, and where the one or more ranges of HPAs include memory addresses interleaved between a plurality of different memory control systems. In this example or any other example, the slice identifier of each DPA is encoded by a plurality of bits of the DPA, and uniquely identifies the allocation slice of the disaggregated memory pool that the DPA corresponds to. In this example or any other example, the TAD is selected from a set including multiple potential TADs, each having different performance characteristics. In this example or any other example, each of multiple allocation slices allocated to the compute nodes use different TADs having different performance characteristics. In this example or any other example, memory addresses corresponding to a particular allocation slice are interleaved between a plurality of physical memory units of the disaggregated memory pool.

In an example, a method for memory address mapping in a disaggregated memory pool comprises: receiving, at a memory control system, an indication of one or more ranges of host physical addresses (HPAs) from a compute node of a plurality of compute nodes communicatively coupled to the disaggregated memory pool, the one or more ranges of HPAs including a plurality of memory addresses corresponding to different allocation slices of the disaggregated memory pool that are allocated to the compute node, and the one or more ranges of HPAs including memory addresses maintained by multiple different memory control systems; converting the two or more ranges of HPAs into a contiguous range of device physical addresses (DPAs), only including memory addresses maintained by the memory control system; for each DPA, confirming that the allocation slice that the DPA corresponds to has been allocated to the compute node based on the slice identifier and a slice-to-node index; for each DPA, identifying a target address decoder (TAD) for an allocation slice of the disaggregated memory pool that the DPA corresponds to, based on a slice identifier included in the DPA and a slice-to-TAD index; and for each DPA, mapping the DPA to a media-specific physical element of a physical memory unit of the disaggregated memory pool based on the TAD.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for mapping addresses of physical memory units in a disaggregated memory pool, the method comprising:

receiving, at a memory control system and based on a computing node attempting to access data on the disaggregated memory pool, an indication of a plurality of ranges of host physical addresses (HPAs) from the compute node of a plurality of compute nodes that are communicatively coupled to the disaggregated memory pool, the plurality of ranges of HPAs including a plurality of memory addresses corresponding to different allocation slices of the disaggregated memory pool that are allocated to the compute node;

converting the plurality of ranges of HPAs into a contiguous range of device physical addresses (DPAs);

for each DPA, identifying a target address decoder (TAD) for an allocation slice of the disaggregated memory pool that the DPA corresponds to, based on a slice identifier included in the DPA and a slice-to-TAD index; and for each DPA, mapping the DPA to a media-specific physical element of a physical memory unit of the disaggregated memory pool based on the TAD.

2. The method of claim 1, where the plurality of ranges of HPAs are non-contiguous.

3. The method of claim 1, where the continuous range of DPAs includes only memory addresses maintained by the memory control system, and where the plurality of ranges of HP As include memory addresses interleaved between a plurality of different memory control systems, such that parallel access of the plurality of different memory control systems by the compute node reduces a latency of memory access by the compute node.

4. The method of claim 1, wherein the continuous range of DPAs is zero-based.

5. The method of claim 1, wherein the slice identifier of each DPA is encoded by a plurality of bits of the DPA, and uniquely identifies the allocation slice of the disaggregated memory pool that the DPA corresponds to.

6. The method of claim 1, further comprising, for each DPA, confirming that the allocation slice that the DPA corresponds to has been allocated to the compute node based on the slice identifier and a slice-to-node index.

7. The method of claim 1, wherein the TAD is selected from a set including multiple potential TADs, each having different performance characteristics.

8. The method of claim 7, wherein each of multiple allocation slices allocated to the compute node use different TADs having different performance characteristics.

9. The method of claim 1, wherein memory addresses corresponding to a particular allocation slice are interleaved between a plurality of physical memory units of the disaggregated memory pool.

10. The method of claim 1, further comprising mapping the contiguous range of DPAs to a set of pooled physical addresses (PPAs) controlled by the memory control system, such that memory addresses from two or more compute nodes of the plurality are mapped to the set of PPAs.

11. The method of claim 1, wherein the physical memory units are dynamic random access memory (DRAM) units.

12. The method of claim 1, wherein each allocation slice corresponds to 1 gigabyte of memory.

13. A memory control system, comprising:
a logic subsystem configured to:
receive, based on a computing node attempting to access data on a disaggregated memory pool, an indication of a plurality of ranges of host physical addresses (HPAs) from the compute node of a plurality of compute nodes communicatively coupled with the disaggregated memory pool, the plurality of ranges of HPAs including a plurality of memory addresses corresponding to different allocation slices of the disaggregated memory pool that are allocated to the compute node;
convert the plurality of ranges of HPAs into a contiguous range of device physical addresses (DPAs);
for each DPA, identify a target address decoder (TAD) for an allocation slice of the disaggregated memory pool that the DPA corresponds to, based on a slice identifier included in the DPA and a slice-to-TAD index; and
for each DPA, map the DPA to a media-specific physical element of a physical memory unit of the disaggregated memory pool based on the TAD.

14. The memory control system of claim 13, wherein the one or more ranges of HPAs are non-contiguous.

15. The memory control system of claim 13, wherein the continuous range of DPAs includes only memory addresses maintained by the memory control system, and where the plurality of ranges of HPAs include memory addresses interleaved between a plurality of different memory control systems.

16. The memory control system of claim 13, wherein the continuous range of DPAs includes only memory addresses maintained by the memory control system, and where the plurality of ranges of HPAs include memory addresses interleaved between a plurality of different memory control systems, such that parallel access of the plurality of different memory control systems by the compute node reduces a latency of memory access by the compute node.

17. The memory control system of claim 13, wherein the continuous range of DPAs is zero-based.

18. The memory control system of claim 13, wherein the slice identifier of each DPA is encoded by a plurality of bits of the DPA, and uniquely identifies the allocation slice of the disaggregated memory pool that the DPA corresponds to.

19. The memory control system of claim 13, wherein the logic subsystem further configured to, for each DPA, confirm that the allocation slice that the DPA corresponds to has been allocated to the compute node based on the slice identifier and a slice-to-node index.

20. The memory control system of claim 13, wherein the TAD is selected from a set including multiple potential TADs, each having different performance characteristics.

* * * * *